WAVESHAPING CIRCUIT APPARATUS

Filed Oct. 17, 1967 4 Sheets-Sheet 1

INVENTOR
THOMAS P. HARPER

BY Norman R Bardales
ATTORNEY

3,497,724
WAVESHAPING CIRCUIT APPARATUS

Thomas P. Harper, Decatur, Ala., assignor to International Business Machines Corporation, Armonk, N.Y., a corporation of New York Filed Oct. 17, 1967, Ser. No. 675,954
Int. Cl. H03k 5/00
U.S. Cl. 307—261 28 Claims

ABSTRACT OF THE DISCLOSURE

A circuit apparatus for waveshaping an input signal having at least one instantaneous bipolar transition so as to provide an output signal having a sinusoidal characteristic responsive to the transition. The circuit employs the non-linear impedance characteristics of active elements included in the feedback circuit of a differential amplifier for providing the desired waveshaping characteristic.

The invention described herein was made in the performance of work under a NASA contract and is subject to the provisions of Section 305 of the National Aeronautics and Space Act of 1958, Public Law 85–568 (72 Stat. 435; 42 U.S.C. 2457).

Background of the invention

This invention relates to waveshaping circuit apparatus and more particularly to waveshaping circuit apparatus for shaping an instantaneous bipolar transition of an input signal.

Signals having instantaneous bipolar transition characteristics are generally employed in diverse applications, such as, for example, the data processing arts, pulse signal transmission arts, etc., to name just a few. It is often desirable to waveshape or condition these signals, and the circuit apparatus which provides this function is generally referred to as a signal conditioner or waveshaper. By way of example, the PCM transmission systems, spurious side band components are generated in the RF signal frequency caused by the modulating signal generated by a particular type of modulating system such as, for example, a binary type. These spurious signals cause interference in adjacent frequency channels. Premodulation pulse train filters of the prior art employed miniature LC filters to eliminate generation of these unwanted side bands in the output signal. However, the LC filters of the prior art were generally designed for specific bandwidths and the modulating waveform is usually not symmetrical. Also, the physical characteristics of the LC components present a limit on their degree of circuit miniaturization since the inductive component is not readily compatible to instrumentation and/or fabrication in integrated circuits.

Summary of the invention

It is an object of this invention to provide a waveshaping circuit apparatus which provides an output signal having a sinusoidal characteristic in response to the transition of an input signal.

It is another object of this invention to provide waveshaping circuit apparatus of the aforedescribed type which first shapes the instantaneous transition into a linear rate of change and subsequently shapes the linear rate of change into a sinusoidal rate of change.

It is another object of this invention to provide waveshaping circuit apparatus of the aforedescribed type which employs active components and does not require the use of inductive elements.

Still another object of this invention is to provide waveshaping circuit apparatus of the aforementioned type which is compatible to implementation by integrated circuit techniques.

According to the invention there is provided circuit apparatus for waveshaping an input signal having at least one substantially instantaneous bipolar transition. It comprises, inter alia, a first stage having in combination first operational amplifier means and associated therewith first feedback circuit means. The first stage provides a first output signal having a linear rate of change in response to the instantaneous transition of the input signal. The circuit apparatus further provides a second stage having in combination second operational amplifier means and associated therewith second feedback circuit means. The second stage provides a second output signal having a sinusoidal rate of change in response to the linear rate of change of the first output signal.

The foregoing and other objects, features and advantages of the invention will be apparent from the following more particular description of the preferred embodiments of the invention, as illustrated in the accompanying drawing.

Brief description of the drawing

In the figures, like elements are designated with similar reference numerals.

Description of the preferred embodiments

Figure 1:
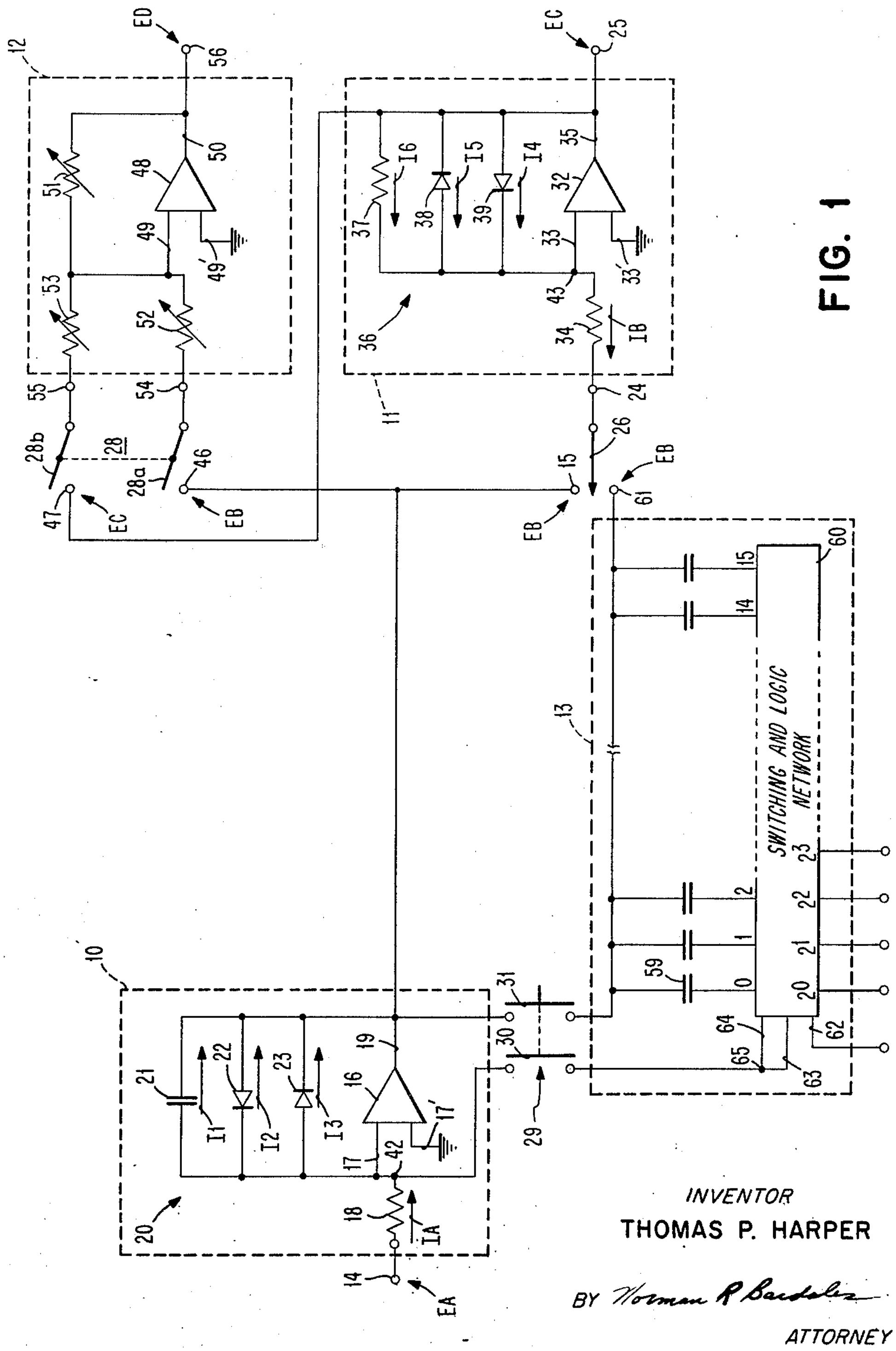
FIG. 1 is a schematic view of a preferred embodiment of the invention.

Referring to FIG. 1, the waveshaper of the present invention is shown as comprising a pair of stages 10, 11. Alternatively, to the stages 10, 11 may be added third and fourth stages 12, 13 as will be explained in greater detail hereinafter.

Stage 10 is an input stage to which is applied at its input terminal 14 one or more bipolar input signals that have at least one rapid or substantially instantaneous rate of change when changing from one input level to another input level of opposite polarity. In response to the input signal, stage 10 generates at its output terminal 15 an opposite-phase bipolar output signal. Stage 10, in addition, provides this output signal with a linear rate of change when the input signal undergoes an instantaneous transition from one output level to another output level of opposite polarity. Thus, by way of example only, stage 10 converts each rectangular shaped pulse of the bipolar pulse train signal EA, c.f. waveform A of FIG. 2, which is applied to input terminal 14 into an opposite-phase trapezoidal shaped pulse of the pulse train signal EB, c.f. waveform B, at the output terminal 15. In the preferred embodiment, stage 10 comprises a high gain, operational amplifier 16 which has a pair of inputs 17, 17'. Operational amplifiers are generally known in the art and, for example, a commercially available integrated circuit type known as the uA702C may be employed for the amplifier 16 of stage 10 for this purpose. Input 17 is generally referred to in the art as the inverting input or —input, whereas input 17' is generally referred to as the non-inverting input. Input 17 is connected via resistor 18 to terminal 14 and input 17' is connected to a null or ground reference. The amplifier's output 19 is connected to terminal 15. The amplifier 16 has associated therewith a feedback circuit indicated generally by the reference character 20. Feedback circuit 20 includes a capacitor 21 which is shunted across the input 17 and output 19. The feedback circuit 20 also includes a pair of circuit elements having complementary variable impedance characteristics. For this purpose a clipping circuit such as, for example, the oppositely poled parallel diodes 22, 23 is provided. The diodes 22, 23 are shunted across the input 17 and output 19 and clamp the positive and negative levels, respectively, of the output signal at terminal 15. Alternatively, the clipping circuit may utilize two series diodes, such as Zener diodes, connected in a back-to-back relationship across the input 17 and output 19.

Stage 11 is an output stage. It provides further waveshaping to the bipolar output signal generated by stage 10 at terminal 15 and which is applied to the input terminal 24 of stage 11. In response to this output signal, stage 11 generates at its output terminal 25 an opposite-phase bipolar output signal. Moreover, when the output signal of stage 10 undergoes a linear rate of transition from one output level to another level of opposite polarity, stage 11 provides its output signal with a transition having a sinusoidal rate of change. Thus, in response to the aforedescribed trapezoidal shaped pulse train signal EB from the output of stage 10 of the given example, stage 11 generates a pulse train output signal EC, c.f. waveform C of FIG. 2, each pulse of which has sinusoidal shaped trailing and leading edges. For the embodiment in which only two stages 10, 11 are employed, switch 26 connects the input terminal 24 of stage 11 to the output terminal 15 of stage 10, the other switches 28, 29 and more specifically their respective armatures 28*a*, 28*b*, 30, 31 being maintained in their respective open positions as shown in FIG. 1 so as to disconnect stages 12 and 13 from the interconnected stages 10, 11. Stage 11 also comprises a high gain, operational amplifier 32 which may be of the identical type employed for amplifier 16. Amplifier 32 has a pair of inputs 33, 33' which are the inverting and non-inverting inputs, respectively. Input 33 is connected to terminal 24 via resistor 34 and input 33' is connected to a null or ground reference. Output 35 of amplifier 32 is connected to output terminal 25 of stage 11. Stage 11 also includes a feedback circuit indicated generally by the reference character 36, which is associated with the amplifier 32. It includes an impedance having a linear impedance characteristic such as resistor 37 and a pair of circuit elements having complementary variable impedance characteristics such as, for example, oppositely poled parallel diodes 38, 39 which are of identical type. Feedback elements 37–39 are connected in parallel across the input 33 and output 35 of amplifier 32.

The prinicples of operational amplifiers employing feedback have been explained heretofore in the art such as, for example, in the publication entitled "Understanding High-Speed Operational Amplifiers" appearing in Electronic Industries, February 1964, pp. 106–111. Briefly, it is the inherent characteristic of such amplifiers to provide an output signal which tends to maintain its inverting input at the null or ground reference by providing whatever current is needed through the feedback circuit to accomplish this purpose. As a consequence, if an operational amplifier with sufficient gain employs feedback, the feed-forward characteristics of the operational amplifier and its feedback loop are functions only of the feedback loop and not of the amplifier itself. The output signal is thus a function of the feedback current and the impedance of the feedback element. For a more detailed description of the operational analysis of operational amplifiers, further reference may be made to the aforementioned publication.

Figure 2:
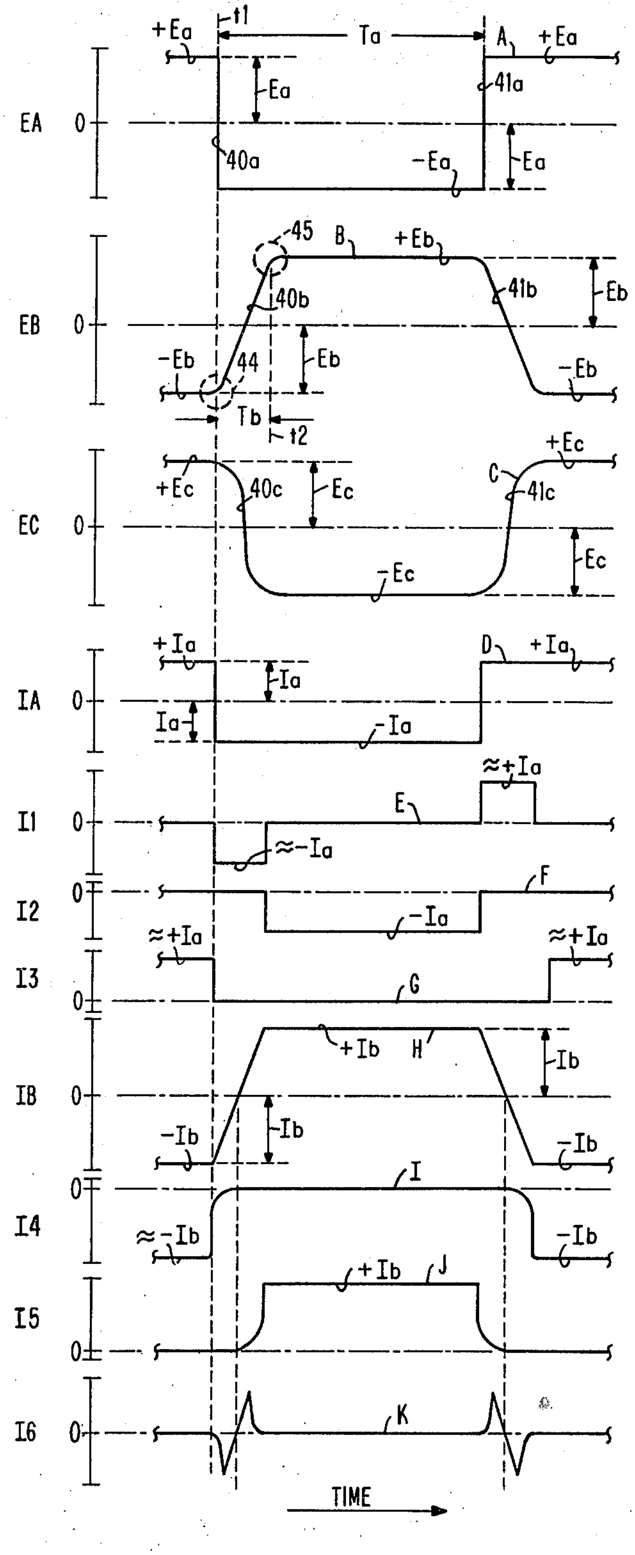
FIG. 2 is a waveform timing diagram of various voltage and current waveforms associated with the circuit of FIG. 1.

The operation of the circuit of FIG. 1 wherein only the two stages 10, 11 are interconnected will now be described with reference to the waveforms of FIG. 2. Accordingly, as aforementioned, switch 26 is placed in contact with terminal 15 and switches 28, 29 are placed in their respective open positions. For purposes of explanation, it is assumed that a bipolar pulse train signal EA, FIG. 2, is applied to terminal 14 and the signal has constant positive and negative peak amplitude levels $\pm Ea$. As is partially shown by waveform A, FIG. 2, signal EA has alternate positive and negative pulse cycles, a typical negative pulse cycle being completely illustrated in the time period T*a* which commences at time *t*1. It should be noted that the leading and trailing edges, e.g. edges 40*a*, 41*a*, respectively, of the pulses of signal EA, which are illustrated in idealized form for sake of clarity, have rapid rise and fall times and, therefore, the bandwidth associated with these pulses will be extremely wide as is well known to those skilled in the art. Immediately prior to time *t*1, signal EA is at a positive level $+Ea$. Phase reversed signal EB will be accordingly at a negative level $-Eb$ which is sufficient to cause the inverting input 17 to be maintained substantially at the null or ground reference level. As is well known to those skilled in the art, the input current IA under these circumstances will be approximately equal to the applied input voltage E*a* divided by the resistance value of resistor 18. Current IA is illustrated by the waveform D of FIG. 2 and is shown as having an amplitude level $+Ia$ prior to time *t*1. Under these circumstances, diode 23 is conducting in its forward direction and the current IA is substantially passed therethrough. Diode 22, on the other hand, is reverse biased and it passes a negligible back current. Diode 23 effectively short circuits capacitor 21 and consequently immediately prior to time *t*1 there is no current being passed by capacitor 21 and the output signal EB is clamped to the level $-Eb$. Currents I1, I2, and I3 are the currents associated with capacitor 21, diode 22, and diode 23, respectively, and are shown by the respective waveforms E, F, and G of FIG. 2. The relationship between the currents may be substantially expressed by Equation 1 below with reference to the current summing node or null point 42, as follows:

$$IA = I1 + I2 + I3 \quad (1)$$

With signal EB at the level $-Eb$ prior to time *t*1, signal EC is phase reversed and at the level $+Ec$, c.f. waveform C, FIG. 2. The positive level $+Ec$ is sufficient to cause the inverting input 33 of amplifier 32 to be maintained substantially at the null or ground reference level. Furthermore, the signal EB which is applied to the input terminal 24 of stage 11 generates a corresponding input current IB which is equal to the value of the input signal EB divided by the value of the resistor 34, c.f. waveform H of FIG. 2 and shown therein as having a negative level $-Ib$. Under these circumstances, diode 39 is conducting in its forward direction and the current IB is substantially passed therethrough. Diode 38 on the other hand, is reverse biased and it passes a negligible back current. Diode 39 effectively short circuits resistor 37 and consequently immediately prior to time *t*1 there is no current being passed by resistor 37 and the output signal EC is clamped to the positive level $+Ec$. Currents I4, I5 and I6 are the currents associated with diode 39, 38 and resistor 37, respectively, and are illustrated in FIG. 2 by respective waveforms I, J and K. The relationship between the currents may be expressed substantially by Equation 2 below with reference to the current summing node or null point 43, as follows:

$$IB = I4 + I5 + I6 \quad (2)$$

At time *t*1, the input signal EA undergoes an instantaneous transition from the positive level $+Ea$ to a negative level —E*a*. Simultaneously, the current IA undergoes an instantaneous transition from a positive level +I*a* to a negative level —I*a*, c.f. waveform D. Due to its inherent characteristic, the negative feedback operational amplifier 16 provides a feedback current which tends to maintain its inverting input 17 at the reference ground level. In doing so, the feedback current is maintained by amplifier 16 equal to the input current IA, and consequently it has a constant amplitude level —I*a*. Capacitor 21, in coaction with the resistor 18, commences to pass the constant amplitude level current and in order to do so the voltage across the capacitor 21, which is also the voltage across the feedback circuit 20, varies or changes at a linear rate since it cannot do so instantaneously. Thus, the output signal EB is provided with the ramp portion **40*b*** as the constant current *IB=Ib=I*1 passes through capacitor 21. The ramp portion **40*b*** goes from a negative level —E*b*, through a zero crossover, and to a positive level +E*b* during the period T*b* which terminates at time *t*2. When the output signal EB reaches the positive level +E*b* at time *t*2, it becomes clamped thereto by the diode 22. Positive level +E*b* is sufficient to cause the inverting input 17 to be maintained substantially at the null or ground reference level. Thus, immediately after time *t*2, the input current *IA*=—*Ia* will be substantially passed by the then forwardly conducting diode 22 and no current will pass through capacitor 21 and only a negligible back current flows through the diode 23 as illustrated by the respective waveforms E, F, G of their associated currents I1, I2, and I3.

During the period T*b*, signal EB generates the ramp portion **40*b* as aforedescribed causing a corresponding ramp portion to be present in the input current IB to stage 11**. When the signal EB initially undergoes the transition from its negative level —E*b* at time *t*1, diode 39 remains forward biased and operating in its ON region and diode 38 remains reverse biased and operating in its OFF region. As the feedback signal across the feedback circuit 36 begins to decrease in response to the negatively decreasing portion of the ramp **40*b* of signal EB, diode 39 sequentially operates in its ON region, through the transition region of its associated input versus output characteristic curve, as hereinafter further explained, and then in its OFF region. Simultaneously, during the ramp portion 40*b* of signal EB, diode 38 sequentially operates in its OFF region, as hereinafter explained, through its transition region, and finally in its ON region. Thus, at the start of the ramp portion 40*b*, the forward biased diode 39 effectively passes all of the current IB, c.f. waveforms H and I, and no current is effectively passed by the reverse biased diode 38 or resistor 37. As the diode 39 begins to operate in its transition region, the current IB is proportionately passed by the diode 39 and resistor 37. When the diode 39 begins to operate in its OFF region, diode 38 is simultaneously still operating in its OFF region and as a consequence the current IB is effectively passed through the resistor 37. Thus, as shown by the waveform I of FIG. 2, the current 14 through the diode 39** at time *t*1 decays from a negative level approximately equal to —I*b* to a zero level as the ramp **40*b*** of signal EB goes from a negative level —E*b* to the crossover point or zero level. Current I5 on the other hand remains substantially at a negligible or zero level during this same period. During this portion of the ramp **40*b*, the current I6 through resistor 37 gradually increases to some maximum negative level and then returns to the zero level in response to the input signal EB and its corresponding current IB reaching their respective zero crossovers. On the positive rise portion of the ramp 40*b* of signal EB, diodes 38, 39 become forward biased and reverse biased, respectively, but both temporarily continue to operate in their OFF region. As a result, the current IB continues to pass through resistor 37. As the voltage across the diode 38 increases, the diode 38 begins to operate in its transition region and the current IB is proportionally passed both through diode 38 and resistor 37. As the voltage across the diode 38 continues to increase, substantially all of the current IB is effectively passed by the diode 38** so that at time *t*2 the current I5 through diode 38 is substantially at a positive level approximately equal to +I*b*, and the current 14 passing through diode 39 is a negligible back current, and the current 16 passing through resistor 37 is equal to zero.

At time *t*2, diode 38 effectively short circuits resistor 37 and effectively clamps the output signal EC to a negative level —E*c*, the latter being sufficient to maintain the inverting input 33 at the null or ground reference. During the negative and positive portions of ramp **40*b*, when the diodes 39 and 38 are operating, respectively, in their mutually exclusive respective transition regions, the positive and negative sinusoidal characteristic portions of the edge 22*c* of signal EC are generated, respectively. During an intermediate portion of the ramp 40*b*, the intermediate linear portion of the signal EC is generated when the current IB is effectively being passed by the resistor 37 and diodes 38, 39 are simultaneously operating in their OFF regions. As can readily be demonstrated and as shown by the waveforms A–K, the operation of the circuit comprising the interconnected stages 11, 12** of FIG. 1 is reversed when the signal EA undergoes an instantaneous transition from a negative level —E*a* to a positive level +E*a* such as at the end of the time period T*a*.

Figure 3:
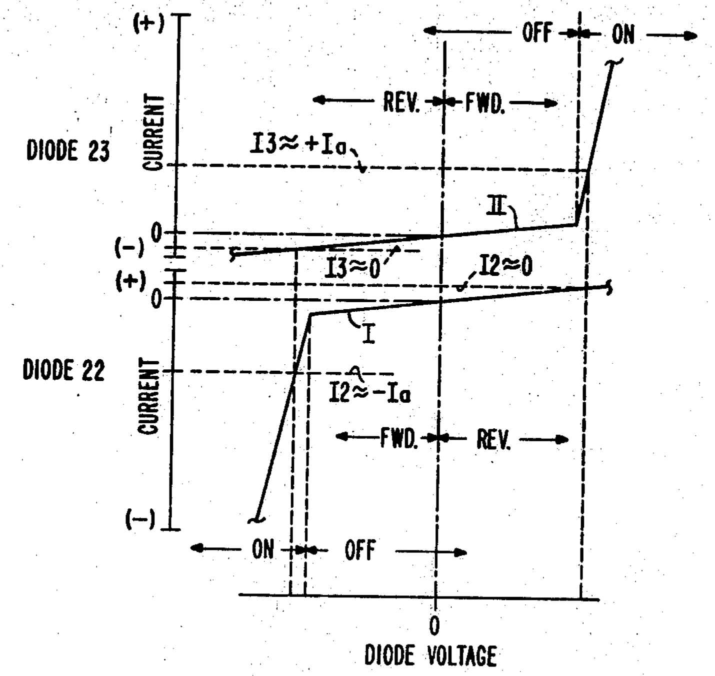
FIG. 3 is the impedance characteristic curves of the diodes of the feedback circuit of the input stage 10 of FIG. 1.

Referring to FIG. 3, there are shown typical current versus voltage characteristic curves I, II of identical type diodes 22, 23, respectively. Curves I, II are plotted in FIG. 3 on a common horizontal axis and their respective vertical current axes take into account the directions of the diode currents relative to the polarity of the input signal EA. When the signal EA is at a positive level +E*a*, the voltage across the feedback circuit 20 is such that diode 23 operates in its ON region. The ON region of a diode corresponds to that part of the forward bias portion FWD of its related transfer or impedance characteristic curve, such as curves I or II, wherein the forward resistance of the diode is low or small and the diode current changes rapidly or significantly for relatively small changes of the diode voltage. The other diode 22 at the same time operates in its OFF region of its curve I and in the reversed bias portion REV thereof. The OFF region of a diode corresponds to that part of its transfer or impedance characteristic curve wherein both the forward and back resistances of the diode are of a relative large magnitude. Consequently, when the diode operates in the OFF region, the diode current does not substantially change for a significant change in diode voltage and the diode current furthermore has substantially a negligible amplitude. The OFF region overlaps both the forward and reverse bias portions FWD, REV, and the diode current is referred to as a back current when the diode is operating in the OFF region of the reverse or back bias portion. Thus, with signal EA at a positive level +E*a*, the current I3 of diode 23 is a forward current and has a positive amplitude level=+I*a* approx., which polarity indicates current flow away from null point 42 and toward element 23. Simultaneously, the current I2 of diode 22 is a back current and also has a positive but negligible amplitude=0 approx. which polarity also indicates current flow away from null point 42 and toward element 22. Conversely, when signal EA is at the negative level —E*a*, diode current I2 is a forward current and is at a negative level=—I*a* approx.; diode current I3 is a back current and is also at a negative but negligible level=0 approx. These negative polarities indicate current flow away from the elements 22, 23 and toward the null point 42. Diodes having rapid or sharp transitions between their ON and OFF regions are preferably employed for the diodes 22, 23 of stage 10 and are well known in the art and may, for example, be of the silicon diode types. As an example, silicon diodes known as IN914 may be employed for this purpose. In practice, resistor 18 is judiciously selected to have a value which is relatively and substantially smaller than the input impedance of amplifier 16 but which is much larger than either of the respective ON resistances of the diodes 22, 23.

Figure 4:
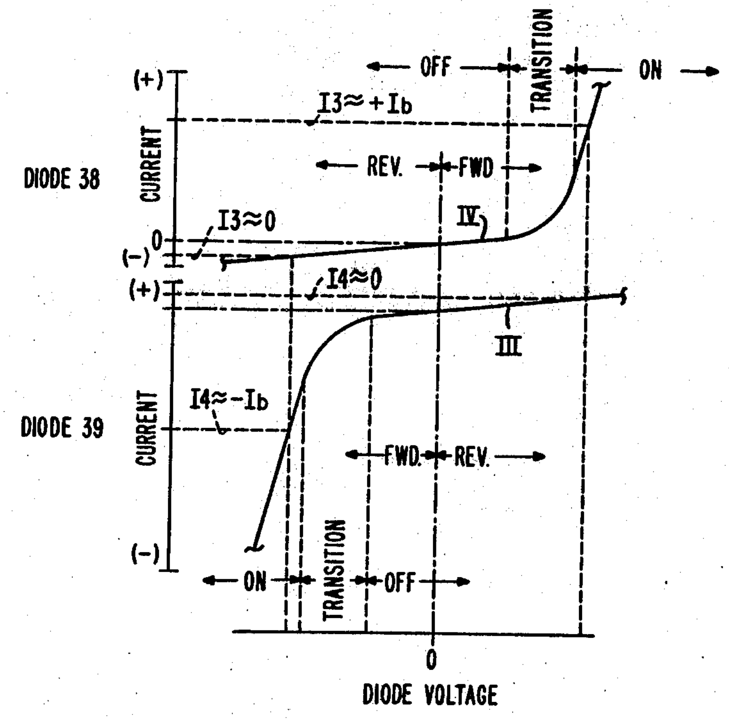
FIG. 4 is the impedance characteristic curves of the diodes of the feedback circuit of the output stage 11 of FIG. 1.

Referring to FIG. 4, there are illustrated typical current versus voltage characteristic curves III, IV of the identical type diodes 38, 39. Curves III and IV are plotted on common horizontal axis and their respective vertical axes taken into account the directions of the diode currents relative to the polarity of the signal EB. When signal EB is at a negative level —E*b* the voltage across the feedback circuit 36 is such that diode 39 is forward biased and operating in its ON region, that is, the low impedance portion of its impedance characteristic curve. Simultaneously, the other diode 38 is back biased and operates in its OFF region, that is the high impedance portion of its impedance characteristic curve. During the transition 40*b* of signal EB, the ON resistance of the forwardly biased diode 39 increases. This increase or change begins gradually and becomes effective when diode 38 is operating in the TRANSITION region of its characteristic curve III, that is the intermediary portion of the curve where the impedance characteristic has a predetermined degree of curvature. The resistance of diodes 38 or 39 when operating in the TRANSITION region is hereinafter sometimes referred to as its partial ON′ resistance. As the transition 40*b* of signal EB progresses, the partial ON′ resistance of the forward biased diode 39 further increases, and when the transition of signal EB causes diode 39 to operate in its OFF region, the resistance of diode 39 is equal to its OFF resistance. Simultaneously, during the transition 40*b* of the signal EB, the resistance of the other diode 38 decreases from its OFF resistance, passes through its partially ON′ resistance, and finally attains its ON resistance. Thus, with signal EB at a negative level —E*b*, current I4 of diode 39 is a forward current and at a negative level=I*b* approx. indicating current flow from element 39 toward null point 43. Simultaneously, the current I5 of diode 38 is a back current which is also at a negative but negligible level=0 approx. Its negative polarity indicates that the current flows from diode 38 into or toward the null point 43. Conversely, when the signal EB is at a positive level +E*b*, current I4 is a back current and at a positive but negligible level=0 approx.; current I5 is a forward current and at a positive level=+I*b* approx., which positive polarities indicate current flow away from junction 43 and toward respective elements 38, 39. Diodes 38, 39 have nonlinear characteristics with a degree of curvature which permits gradual transitions between their respective ON and OFF regions. Diodes having these characteristics are employed for the diodes 38, 39 and are well known in the art. These may be, for example, of the germanium diode types. As an example, germanium diodes known as IN270 may be employed for this purpose. In practice, resistor 34 is judiciously selected to have a value which is small compared to the input impedance of amplifier 32 but which is large compared to the value of the ON or partial ON′ resistances of either of the diodes 38, 39. Furthermore, the resistance value of resistor 37 is selected to be greater than the value of resistor 34 and consequently larger than the ON or partial ON′ resistances of either of the diodes 38, 39. Resistor 37 is further selected to be smaller than the input impedance of amplifier 32.

Figure 5:
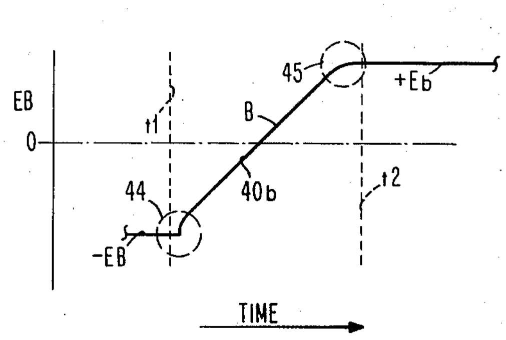
FIG. 5 is an enlarged, partially shown, waveform timing diagram of the signal EB shown in FIG. 2.

In general, for certain applications the embodiment of the exclusively interconnected stages 10, 11 effectively reduces the bandwidth of the pulses of the input signal EA and thereby its accompanying spurious sideband components. In other applications, further waveshaping may be desired. The signal EB exhibits certain transients associated with the terminal parts of its ramp portions. Referring to waveform B, FIG. 2, the terminal parts of the ramp portion 40*b*, for example, of signal EB are indicated generally within the dash line encirclements 44, 45 which are also shown on an enlarged scale in FIG. 5. Examination of the ramp portion 40*b* will show that the beginning and end of the ramp have exponential-like curve characteristics. These exponential-like curve characteristics are due to the capacitive loads on the amplifier 16. More specifically, the beginning of the ramp has a severe discontinuity (when magnified) that is transmitted to the shape of the output signal EC. The other end of the ramp is a soft or a more gradual curve and also affects the shape of the output signal EC. These exponential-like curve characteristics have associated therewith certain harmonic contents. In certain applications, it is desirable that the harmonics associated with these characteristics be attenuated in order that the accompanying bandwidh may also be reduced. Still, in other applications, it is desirable that the harmonics, or certain parts thereof, associated with these characteristics be transmitted. In either of these aplications, stage 12 provides further waveshaping for this purpose. More particularly, stage 12 provides, in response to the instantaneous bipolar transition of signal EA of stage 10 and the corresponding linear rate of change of the signal EB of stage 11, an output signal which has a sinusoidal rate of change and a predetermined harmonic content. As explained hereinafter, the harmonic content may be preselected to be substantially from zero to one hundred percent. Accordingly, the commonly ganged armatures 28*a*, 28*b* of switch 28 are placed in their respective closed positions with terminals 46, 47. These in turn are connected to the output terminal 15 of stage 10 and output terminal 25 of stage 11, respectively. It should be understood that switch 26 is also connected to the output terminal 15. Stage 12 comprises an operational amplifier 48 which may be of the same type as those of operational amplifiers 16 and 32. Amplifier 48 has an inverting input 49 and a non-inverting input 49′ which is at a null or ground reference potential. Connected across the inverting input 49 and output of amplifier 48 is a feedback resistor 51. In addition, a pair of input resistors 52, 53 are connected to the respective input terminals 54, 55 of stage 12, which in turn are connected to the armatures 28*a*, 28*b*, respectively. Resistors 52, 53 are also connected to the inverting input 49 of amplifier 48. The output of stage 12 is provided at terminal 56.

Figure 6:
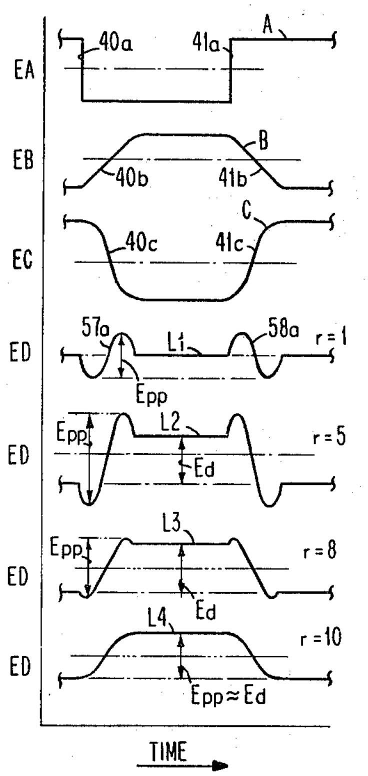
FIG. 6 is a waveform timing diagram of various voltages associated with the circuit of FIG. 1 when stage 12 is connected thereto.

In operation, predetermined proportions of the signals EA and EB are summed by operational amplifier 48 via respective resistors 52, 53 together with the feedback signal developed across feedback resistor 51. As a result, an output signal ED is provided at terminal 56 in which the harmonic content resulting from the aforementioned exponential-like curve charactermistics of the signal EB is attenuated or is alternatively transmitted, in whole or in part, to the signal ED's waveshape. For example, the ratio $r=R1/R2$ of the resistive values R1, R2 of resistors 52, 53, respectively, may be adjusted for this purpose. Referring to FIG. 6, there are shown waveforms A, B, C of signals EA, EB, EC, respectively, which are associated with a particular device built in accordance with the principles of the three stage embodiment 10, 11, 12 of FIG. 1 and the resulting waveforms L1–L4 of the output signal ED for different ratios *r*. With the ratio $r=1$, the resistors 52, 53 are equal. As a consequence, when the pulses of signals EA and EB are summed in stage 12, the output signal ED is illustrated by the waveshape L1 and has sinusoidal shaped edges 57*a*, 58*a*. These edges 57*a*, 58*a* have peak-to-peak amplitudes, e.g. amplitude E*pp*, that are greater than the peak-to-peak level E*d* of the horizontal portion of the output signal pulse of signal ED illustrated by the waveform L1. For the sake of clarity, level E*d* in wavefom L1 is illustrated as being negligible and equal to zero. Under these circumstances, substantially all of the harmonic content associated with the aforementioned exponential-like curve characteristic of signal EB are transmitted to the waveshape of the signal ED. As the ratio *r* is increased, the difference between the peak-to-peak amplitude E*pp* of the edges of the pulse of signal ED with respect to the peak-to-peak amplitude E*d* of the horizontal portion of the corresponding output pulse of signal ED decreases, c.f. waveforms L2, L3. Complete compensation, i.e. maximum attenuation of the harmonics resulting from the aforementioned exponential-like curve characteristics of signal EB, is obtained when the peak-to-peak level E*pp* equal E*d* approx., c.f. waveform L4, for example. As is obvious to those skilled in the art, the foregoing may also be accomplished by alternatively adjusting the resistive values of one or more of the resistors 51, 52, 53.

Further waveshaping may be provided for the signal EC of the two stage embodiment 10, 11 or to the signal ED of the three stage embodiment 10, 11, 12 by interconnecting the stage 13 to stages 10 and 11 by closure of switch 29. Stage 13 accordingly includes a plurality of parallel feedback capacitors, e.g. capacitor 59. With armature 30 closed, one or more of these capacitors of stage 13 may be selectively connected across the input 17 and output 19 of amplifier 16 by a switching network 60. As a result, the overall feedback capacitance across amplifier 16 is increased by the addition of the selected feedback capacitor(s) of stage 13 to the capacitor 21 of stage 10 thereby changing and providing different slopes for the ramp portions 40*a*, 40*b* of signal EB. It is to be understood that when the stage 13 is utilized with either the two or three stage embodiments 10–11 or 10–12, of the circuit of FIG. 1, switch 26 is connected to the terminal 61 of stage 13 and the commonly ganged armatures 30, 31 placed in their respective closed positions. With switch 29 closed, the output 19 of amplifier 16 is connected via armature 31 to terminal 61 and the signal EB is present thereat.

In practice, the switches of the switching network 60 are preferably electronically controlled switches. A suitable circuit for this purpose is a commercially available integrated circuit type referred to as a random access multiplexer and known as MEM 5015. The MEM 5015 has included therein sixteen selectable parallel switching channels associated with terminals 0–15, respectively. Each of these terminals are connected to one of the plural feedback capacitors, e.g. capacitor 59. The sixteen channels are controlled or addressed by four digit binary encoded signals which are fed to terminals $2^0$–$2^3$ in conjunction with an enabling signal which is applied to terminal 62 and referred to as the "Parallel Load" in the known circuit. Output terminals 63 and 64 are referred to as "Bus #2" and "Bus #3," respectively, in the known circuit and are commonly connected at junction 65 to form one common output terminal for connecting the lower electrode(s) of the related feedback capacitor(s), e.g., capacitor 59, to the input terminal 17 of amplifier 16 via armature 30.

Figure 7:
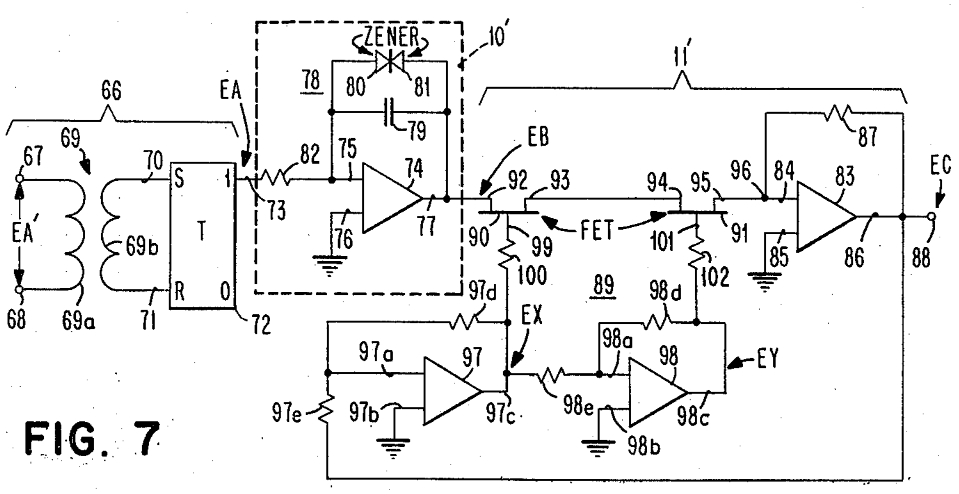
FIG. 7 is a schematic view of another preferred embodiment of the invention.

Referring to FIG. 7, there is shown another embodiment of the invention. This embodiment is shown as comprising input and output stages 10′, 11′, respectively. In addition, a pre-input stage 66 may be provided, if desired. Accordingly, stage 66 normalizes or standardizes the amplitudes of the pulses of the signal EA′ which are applied across the input terminals 67, 68 of stage 66. Terminals 67, 68 are connected to the input winding 69*a* of isolation transformer 69. The output winding 69*b* of the transformer is connected across the set and reset inputs 70, 71, respectively, of the trigger circuit 72. In operation, the trigger circuit 72 responds to the transitions or edges of the input pulses of the signal EA′. The trigger circuit 72 is so biased that the output signal EA appearing at its "1" output terminal 73 undergoes a transition from a given amplitude level to an equal amplitude level of opposite polarity in response to each of the transitions of the pulses of signal EA′.

Stage 10′ comprises a high gain, operational amplifier 74 which has inverting and non-inverting inputs 75, 76, respectively. Operational amplifier 74 may be of the identical type employed for amplifiers 16, 32 or 48, FIG. 1. The output 77 of amplifier 74 is connected by the feedback circuit indicated generally by the reference numeral 78 to the inverting input 75. By way of example, feedback circuit 78 is shown as comprising a capacitor 79 and a pair of series connected identical feedback Zener diodes 80, 81 which are connected with respect to each other in a back-to-back manner. Input 75 is connected via input resistor 82 to the "1" output 73 of trigger circuit 72. The other input 76 is connected to a null or ground reference. In operation, stage 10′ performs in a manner similar to the operation of the aforedescribed stage 10 of circuit 1. Thus, at the output 77 of amplifier 74 in response to the rectangular shaped pulses of the bipolar pulse train signal EA, FIG. 7, there is provided an opposite-phase bipolar pulse train signal EB, FIG. 7, having trapezoidal shaped pulses.

In stage 11′, there is provided a high gain operational amplifier 83 having inverting and non-inverting inputs 84, 85, respectively. The output 86 of amplifier 83 is connected through a feedback element having a linear impedance characteristic, e.g. resistor 87, to the inverting input 84. Output 86 of amplifier 83 is also connected to the output terminal 88 of the circuit of FIG. 7. In lieu of the diodes 38, 39 located on the feedback circuit 36 of stage 11, FIG. 1, there is provided in the stage 11′ of FIG. 7 an electronic feedback servo loop indicated generally by the reference character 89. The servo loop includes a pair of series connected field effect transistors 90, 91 (FET) which are configured as common gate amplifiers. Accordingly, the source electrode 92 of FET 90 is connected to the output 77 of amplifier 74 of stage 10′, and its drain electrode 93 is serially connected to the source electrode 94 of FET 91. The drain electrode 95 of FET 91 is connected to the current summing node or null point 96 to which is also connected the inverting input 84 of amplifier 83. The other input 85 of amplifier 83 is connected to a null or ground reference. The control of the drain to source output of the respective FETs 90, 91 is provided by the pair of interconnected negative feedback high gain operational amplifiers 97, 98, which coact with the output signal EC, FIG. 7, in a complementary manner as explained hereinafter. Accordingly, each of the operational amplifiers 97, 98 have respective inverting and non-inverting inputs 97*a*, 98*a*, and 97*b*, 98*b*. Each of the non-inverting inputs 97*b*, 98*b* are connected to a null or ground reference. Each of the amplifiers 97, 98 has its respective outputs 97*c*, 98*c* connected to its inverting input 97*a*, 98*a* by a feedback register 97*d*, 98*d*. An input resistor 97*e* of amplifier 97 is connected to the output 86 of amplifier 83. Output 97*c* of amplifier 97 is also connected to the gate electrode 99 of FET 90 via resistor 100. It is also connected via the input resistance 98*e* of amplifier 98 to the input 98*a* of amplifier 98. The output 98*c* of amplifier 98 is connected to the gate electrode 101 of FET 91 via resistor 102. Operational amplifiers 83, 97 and 98 may be of identical types similar to those employed for the aforementioned amplifiers 16, 32, 48 and 74. In operation, the instantaneous gain of amplifier 83 is determined by the drain-to-source resistance of the FET combination 90, 91 and the feedback resistor 87.

For purposes of explanation, it is assumed that the signal EB of FIG. 7 is at a positive level immediately prior to undergoing a transition to a negative level of equal amplitude. Accordingly, under these circumstances, the output signal EC of FIG. 7 present at the ouput 86 of amplifier 83 is at a constant negative level and of sufficient amplitude to maintain the inverting input 84 at the null or ground reference. The output signal EC is also applied to the input 97*a* of amplifier 97 via input resistor 97*e*. At its output 97*c*, amplifier 97 generates a positive level signal EX which is fed back via resistors 97*d* to the inverting input 97*a*. Signal EX has an amplitude sufficient to maintain the inverting input 97*a* at the null or ground reference. Signal EX is also applied to the inverting input 98*a* of amplifier 98 via input resistor 98*c*. As a consequence, an output signal EY is generated at output 98*c* of amplifier 98. Signal EY has a negative level and a sufficient amplitude, which when fed back via resistor 98*d* to the inverting input 98*a*, maintains the latter at the null or ground reference. Under these circumstances, the positive signal EX provides a bias at the gate electrode 99 which saturates FET 90 causing the latter to operate in the high impedance portion of its characteristic curve, not shown. On the other hand, signal EY is at a negative level which provides a bias at gate electrode 101 which causes FET 91 to operate in the linear or low impedance portion of its characteristic curve, not shown.

For purposes of explanation, it is assumed that the signal EB of FIG. 7 now undergoes a ramp transition from its aforementioned positive level, through the zero crossover and ultimately reaches its negative level of equal amplitude. Initially as the ramp approaches the zero crossover, the positive bias on FET 90 decreases but FET 90 still remains in saturation. At the same time, the FET 91 undergoes a transition from the linear portion of its impedance characteristic curve to its non-linear portion. The transition occurs in the intermediary portion of the impedance characteristic curve of FET 91 which has a predetermined degree of curvature. Correspondingly, the non-linear drain-to-source resistance of FET 91 during this part of the transition causes a sinusoidal rate of change to be generated in the waveshape of the output signal EC, FIG. 7, which in response to the transition of signal EB, FIG. 7, is undergoing an opposite-phase transition. As the signal EB, FIG. 7, approaches the zero crossover, and for a brief time period after passing therethrough, both FETs 90, 91 will be biased simultaneously in saturation. During this period, the signal EC undergoes a linear rate of change under the predominate influence of the feedback resistor 87 and goes from a negative to a positive polarity. As the ramp of signal EB, FIG. 7, begins to approach its constant negative level, the bias on gate electrode 99 which is now negative causes FET 90 to operate in the intermediary non-linear portion of its characteristic curve and as a result a sinusoidal rate of change is generated in the waveshape of the output signal EC. During this same period, the bias on gate electrode 101 which is now positive drives the FET 91 into deper saturation. Finally, at the termination of the ramp, the signal EB of FIG. 7 has obtained the constant negative level and FET 90 is so biased by signal EX that it operates in its linear region, whereas FET 91 is biased by signal EY at saturation. Under these latter conditions, the signal EC is now at a constant positive level of sufficient amplitude to maintain the inverting input 84 at the null or ground reference as well as establish the appropriate bias levels for signals EX, EY that are derived therefrom. It can be readily demonstrated that the aforedescribed cycle reverses itself when the signal EB, FIG. 7, undergoes a ramp transition from its constant negative level to its constant positive one.

Typical values for the various circuit components of stages 10, 11, 12, 13, 10′, 11′ are indicated in the Tables I–VI, respectively, as follows:

Table I (Stage 10)

| | |
|---|---|
| Amplifier **16** | Type: uA702C. |
| Diodes **22**, **23** | Type: IN914, each. |
| Resistor **18** | 33,000 ohms. |
| Capacitor **21** | .0068 μf. |

Table II (Stage 11)

| | |
|---|---|
| Amplifier **32** | Type: uA702C. |
| Diodes **38**, **39** | Type: IN270, each. |
| Resistor **34** | 10,000 ohms. |
| Resistor **37** | 10,000 ohms. |

Table III (Stage 12)

| | |
|---|---|
| Amplifier **48** | Type: uA702C. |
| Resistor **51** | 10,000 ohms. |
| Resistor **52** | 100,000 ohms. |
| Resistor **53** | 10,000 ohms. |

Table IV (Stage 13)

| | |
|---|---|
| Circuit **60** | Type: MEM 5015. |
| Capacitors (e.g. capacitor **59**) | .001 μf., each. |

Table V (Stage 10′)

| | |
|---|---|
| Amplifier **74** | Type: uA702C. |
| Zener diodes **80**, **81** | Type: IN3392, each. |
| Resistor **82** | 33,000 ohms. |
| Capacitor **79** | .0068 μf. |

Table VI (Stage 11′)

| | |
|---|---|
| Amplifiers **83**, **97**, **98** | Type: uA702C, each. |
| FETs **90**, **91** | Type: 2N3278, each. |
| Resistor **87** | 15,000 ohms. |
| Resistor **97***d* | 20,000 ohms. |
| Resistor **98***d* | 10,000 ohms. |
| Resistors **97***e*, **98***e* | 10,000 ohms, each. |
| Resistors **100**, **102** | 1,000,000 ohms, each. |

The aforedescribed embodiments have many uses and are particularly useful as premodulation filters for filtering out undesired harmonics. Moreover, while the embodiments may be practiced with discrete components, the circuit is particularly adaptable to integrated circuit implementation, especially microminiature types thereof, because it does not require the use of inductive elements which are not amenable to implementation into integrated circuitry and particularly of the aforementioned microminiature type of integrated circuitry.

Moreover, the operation of the aforedescribed embodiments of the invention has been described for purposes of explanation utilizing input pulse signals which undergo alternate transitions from an amplitude of one polarity to the amplitude of the opposite polarity in a cyclic manner. It should be understood, however, that the input signal may only have one transition. Furthermore, by appropriate modification of their respective circuit parameters other embodiments of the invention may be provided such as, for example, by providing various combinations and permutations of the stages 10, 10′, 11, 11′, 12, 13. and/or 66. For example, stage 66 may be connected to the input of stage 10 if desired, or stage 10′ may be substituted for stage 10 and vice-versa, or stage 13 may be connected between stages 10′ and 11′, to name just a few.

Thus, while the invention has been particularly shown and described with reference to the preferred embodiments, it will be understood by those skilled in the art that the foregoing and other changes in form and detail may be made therein without departing from the spirit and scope of the invention.

What is claimed is:

1. Circuit apparatus for waveshaping an input signal having at least one substantially instantaneous bipolar transition, said apparatus comprising:

a first stage comprising in combination first operational amplifier means and first feedback circuit means associated therewith, said first stage providing a first output signal having a linear rate of change in response to the instantaneous transition of said input signal; and a second stage comprising in combination second operational amplifier means and second feedback circuit means associated therewith, said second stage providing a second output signal having a sinusoidal rate of change in response to the linear rate of change of said first output signal.

2. Circuit apparatus according to claim 1 further comprising:

a third stage comprising in combination third operational amplifier means and third feedback circuit means associated therewith, said third stage being simultaneously responsive to the linear rate of change of said first output signal and the sinusoidal rate of change of said second output signal to provide a third output signal having a sinusoidal rate of change and a predetermined harmonic content.

3. Circuit apparatus according to claim 2 further comprising:

means for varying the rate of change of said first output signal.

4. Circuit apparatus according to claim 1 further comprising:

means for varying the rate of change of said first output signal.

5. Circuit apparatus according to claim 1 wherein said second feedback means comprises a first circuit element having a linear impedance characteristic, and second and third circuit elements having complementary variable impedance characteristics, each of said variable impedance characteristics having low and high impedance portions and an intermediary portion having a predetermined degree of curvature.

6. Apparatus according to claim 5 wherein said first circuit element comprises a resistor, said second and third circuit elements comprise oppositely poled first and second diodes, respectively, each of said first, second and third circuit elements being connected in parallel across said second operational amplifier means.

7. Apparatus according to claim 5 wherein said first circuit element comprises a resistor, said second and third circuit elements comprise first and second serially connected field effect transistor means, and means responsive to such second output signal for controlling said field effect transistors in a complementary manner.

8. Circuit apparatus according to claim 5 wherein said first feedback circuit means comprises a capacitive fourth circuit element, and a pair of fifth and sixth circuit elements having complementary variable impedance second characteristics, each of said variable impedance second characteristics having a low impedance portion and a high impedance portion.

9. Circuit apparatus according to claim 6 wherein said first feedback circuit means comprises a capacitive fourth circuit element, and a pair of fifth and sixth circuit elements having complementary variable impedance second characteristics, each of said variable impedance second characteristics having a low impedance portion and a high impedance portion, said fifth and sixth circuit elements further comprising oppositely poled third and fourth diodes, respectively, each of said fourth, fifth, and sixth circuit elements being connected in parallel across said first operational amplifier means.

10. Circuit apparatus according to claim 7 wherein said first feedback circuit means comprises a capacitive fourth circuit element, and a pair of fifth and sixth circuit elements having complementary variable second impedance characteristics, each of said second variable impedance characteristics having a low impedance portion and a high impedance portion, said fifth and sixth circuit elements further comprising oppositely poled series connected third and fourth diodes, respectively, said fourth circuit element and said series connected fifth and sixth circuit elements being connected in parallel across said first operational amplifier means.

11. Circuit apparatus according to claim 1 wherein said first feedback circuit means comprises a capacitive first circuit element, and a pair of second and third circuit elements having complementary variable impedance characteristics, each of said variable impedance characteristics having a low impedance portion and a high impedance portion.

12. Circuit apparatus according to claim 11 wherein said second and third circuit elements comprise oppositely poled first and second diodes, respectively, each of said first, second, and third elements being connected in parallel across said first operational amplifier means.

13. Circuit apparatus according to claim 11 wherein said second and third circuit elements comprise oppositely poled series connected first and second diodes, said first circuit element and said series connected second and third circuit elements being connected in parallel across said first operational amplifier means.

14. Circuit apparatus for waveshaping an input signal having at least one substantially instantaneous bipolar transition, said apparatus comprising:

a first operational amplifier having inverting and non-inverting first and second input means, respectively, and a first output means, said first input means including a first null point, a first linear impedance connected to said first null point, and means for applying said input signal to said first linear impedance;

a capacitor connected across said first output means and said first null point;

first and second circuit elements having complementary variable impedance first characteristics connected across said first output means and said first null point in a predetermined manner, each of said variable impedance first characteristics having low and high imepdance portions;

a second operational amplifier having inverting and non-inverting third and fourth input means, respectively, and a second output means, said third input means comprising a second null point;

a second linear impedance connected across said second output means and said second null point;

third and fourth circuit means having complementary variable impedance second characteristics and being coupled to said second null point and said second output means in a predetermined manner, each of said variable impedance second characteristics having low and high impedance portions and an intermediary portion having a predetermined degree of curvature;

said first output means providing a first output signal having a linear rate of change in response to the bipolar transition of said input signal applied to said input first linear impedance, said third input means being responsive to said first output signal applied thereto, and said second output means providing a second output signal having a sinusoidal rate of change in response to the linear rate of change of said first output signal applied to said third input means.

15. Circuit apparatus according to claim 14 wherein said first and second circuit elements comprise first and second oppositely poled diodes, respectively, each of said first and second diodes being connected across said first output means and said first null point;

said third and fourth circuit means comprise third and fourth oppositely poled diodes, respectively, each of said third and fourth diodes being connected across said second output means and said second null point; and said third input means further comprises an input third linear impedance connected to said second null point and to said first output means.

16. Circuit apparatus according to claim 15 further comprising:

a third operational amplifier having inverting and non-inverting fifth and sixth input means, respectively, and a third output means, said fifth input means comprising a third null point and input fourth and fifth linear impedances, respectively, commonly connected to said third null point;

a sixth linear imepdance connected across said third output means and said third null point; and means for connecting said first output means and said second output means to said fourth and fifth linear impedances, respectively, said third output means in response to the linear and sinusoidal rates of change of said first output signal and said second output signal, respectively, providing a third output signal having a sinusoidal rate of change and a predetermined harmonic content.

17. Circuit apparatus according to claim 16 further comprising a plurality of second capacitors; and switching means for selectively switching at least one of said second capacitors across said first input means and said first output means to provide said linear rate of change of said first output signal with a predetermined slope characteristic.

18. Circuit apparatus according to claim 14 wherein:

said first and second circuit elements comprise oppositely poled series connected first and second diodes, respectively, said series connected first and second diodes being connected in parallel across said first output means and said first null point; and said third and fourth circuit means comprise first and second field effect transistors, respectively, the drain-to-source first circuit of said first field effect transistor being connected in series with the drain-to-source second circuit of said second field effect transistor, the series connected drain-to-source first and second circuits being connected between said second null point and said first output and the gate electrode circuits of said field effect transistors being coupled in a complementary manner and responsive to said second output signal, a predetermined one of said gate electrode circuits being connected to said second output means.

19. Circuit apparatus according to claim 18 wherein said drain-to-source first circuit is connected to said first output and said drain-to-source second circuit is connected to said second null point;

the gate electrode circuit of said first field effect transistor being said predetermined one of said gate electrode circuits and further comprising:

a third operational amplifier having inverting and non-inverting fifth and sixth input means, respectively, and a third output means having a third null point and an input linear third impedance connected between said third null point and said second output means, a linear fourth impedance connected across said third output means and said third null point, and a linear fifth impedance connected between said third output means and the gate electrode of said first field effect transistor; and the gate electrode circuit of said second field effect transistor further comprising:

a fourth operational amplifier having inverting and non-inverting seventh and eighth input means, respectively, and a fourth output means having a fourth null point and an input linear sixth impedance connected between said fourth null point and said third output means, a linear seventh impedance connected across said fourth output means and said fourth null point, and a linear eighth impedance connected between said fourth output means and the gate electrode of said second field effect transistor.

20. Circuit apparatus according to claim 19 wherein said means for applying comprises:

an isolation transformer having an input winding adapted to receive said input signal and an output winding, and trigger circuit means having first and second input terminals associated therewith, said output winding being connected across said first and second input terminals, said trigger circuit means having a first output terminal connected to said linear first impedance.

21. Circuit apparatus for waveshaping an input signal having at least one substantially instantaneous bipolar transition, said apparatus having first and second stages;

said first stage comprising:

a high gain first operational amplifier having inverting and non-inverting first and second input means, respectively, and a first output means, said first input means including a first null point, an input first resistor connected thereto, and means for applying said input signal to said first resistor, a feedback capacitor connected across said first output means and said first null point, and first and second oppositely poled parallel connected feedback diodes having complementary variable impedance first characteristics connected across said first output means and said first null point, each of said variable impedance first characteristics having low and high impedance portions; and said second stage comprising:

a high gain second operational amplifier having inverting and non-inverting third and fourth input means, respectively, and a second output means, said third input means including a second null point and an input second resistor connected thereto, a feedback third resistor connected across said second output means and said second null point, third and fourth oppositely poled parallel connected feedback diodes having complementary variable impedance second characteristics connected to said third input means and said second output means, each of said variable impedance second characteristics having low and high impedance portions and an intermediary portion having a predetermined degree of curvature;

said first output means providing a first output signal having a linear rate of change in response to the bipolar transition of said input signal applied to said input first resistor, said first output signal being applied to said input second resistor, and said second output means providing a second output signal having a sinusoidal rate of change in response to the linear rate of change of said first output signal applied to said input second resistor.

22. Circuit apparatus according to claim 21 wherein said input first resistor has a resistance first magnitude greater than either of the resistances of said first and second diodes associated with their respective low impedance portions of their said impedance first characteristics, said first magnitude being smaller than the input impedance of said first operational amplifier; and wherein said input second resistor has a resistance second magnitude greater than either of the resistances of said third and fourth diodes associated with either their respective low and intermediary impedance portions of their said impedance second characteristics; said second magnitude being smaller than the input impedance of said second operational amplifier, and wherein further said feedback third resistor has a resistance third magnitude greater than said second magnitude and smaller than the input impedance of said second operational amplifier.

23. Circuit apparatus according to claim 21 further having a third stage, said third stage comprising:

a high gain third operational amplifier having inverting and non-inverting fifth and sixth input means, respectively, and third output means, said fifth input means comprising a third null point and input fourth and fifth resistors commonly connected to said third null point, a feedback sixth resistor connected across said third output means and said third null point, and means for selectively connecting said first output means and said second output means concurrently to said fourth and fifth resistors, respectively, said third output means in response to the linear and sinusoidal rates of change of said first output signal and said second output signal, respectively, providing a third output signal having a sinusoidal rate of change and a predetermined harmonic content.

24. Circuit apparatus according to claim 23 wherein said predetermined harmonic content is substantially zero.

25. Circuit apparatus according to claim 23 further comprising:

a fourth stage having a plurality of feedback second capacitors, and switching means for selectively switching at least one of said second capacitors across said first input means and said first null point means to provide said linear rate of change of said first output signal with a predetermined slope characteristic.

26. Circuit apparatus for waveshaping an input signal having at least one substantially instantaneous bipolar transition, said apparatus having first and second stages;

said first stage comprising:

a high gain first operational amplifier having inverting and non-inverting first and second input means, respectively, and a first output means, said first input means including a first null point, an input first resistor connected thereto, and means for applying said input signal to said first resistor, a feedback capacitor connected across said first output means and said first null point, and first and second oppositely poled series connected feedback diodes having complementary variable impedance first characteristics connected across said first output means and said first null point, each of said variable impedance first characteristics having low and high impedance portions; and said second stage comprising:

a high gain second operational amplifier having inverting and non-inverting third and fourth input means, respectively, and a second output means, said third input means including a second null point, a feedback second resistor connected across said second output means and said scond null point, feedback first and second field effect transistors having series connected drain-to-source first and second circuits, respectively, and having complementary variable impedance second characteristics, each of said variable impedance second characteristics having low and high impedance portions and an intermediary portion having a predetermined degree of curvature, the series connected drain-to-source first and second circuits being connected between said second null point and said first output, and the gate electrode circuits of said field effect transistors being coupled in a complementary manner and responsive to said second output signal, a predetermined one of said gate electrode circuits being connected to said second output means;

said first output means providing a first output signal having a linear rate of change in response to the bipolar transition of said input signal applied to said input first resistor, said first output signal being applied to said series connected drain-to-source first and second circuits, and said second output means providing a second output signal having a sinusoidal rate of change in response to the linear rate of change of said first output signal applied to said series connected drain-to-source first and second circuits.

27. Circuit apparatus according to claim 26 wherein the drain-to-source first circuit of said series connected drain-to-source first and second circuits is connected to said first output and said drain-to-source second circuit is connected to said second null point, the gate electrode circuit of said first field effect transistor being said predetermined one of said gate electrode circuits connected to said second output means, the gate electrode of said first field effect transistor comprising:

a third high gain operational amplifier having inverting and non-inverting fifth and sixth input means, respectively, and a third output means, said fifth input means having a third null point and an input third resistor connected between said third null point and said second output, a feedback fourth resistor connected across said said third output means and said third null point, and a fifth resistor connected between said third output means and the gate electrode of said first field effect transistor; and the gate electrode circuit of said second field effect transistor further comprising:

a fourth high gain operational amplifier having inverting and non-inverting seventh and eighth input means, respectively, and a fourth output means having a fourth null point and an input sixth resistor connected between said fourth null point and said third output means, a feedback seventh resistor connected across said fourth output means and said fourth null point, and an eighth resistor connected between said fourth output means and the gate electrode of said second field effect transistor.

28. Circuit apparatus according to claim 27 wherein said means for applying comprises:

an isolation transformer having an input winding adapted to receive said input signal and an output winding, and trigger circuit means having first and second input terminals associated therewith, said output winding being connected across said first and second input terminals, said trigger circuit means having a first output terminal connected to said first resistor.

References Cited

UNITED STATES PATENTS 3,405,286 10/1968 Mudie ---------- 307—268 XR

JOHN S. HEYMAN, Primary Examiner

JOHN ZAZWORSKY, Assistant Examiner

U.S. Cl. X.R.

307—230, 268; 328—27, 128, 142